UNITED STATES PATENT OFFICE.

JOSEF WEBER, OF ESSEN-ON-THE-RUHR, GERMANY.

PROCESS OF DETINNING.

1,115,262. Specification of Letters Patent. Patented Oct. 27, 1914.

No Drawing. Application filed January 31, 1912. Serial No. 674,501.

*To all whom it may concern:*

Be it known that I, JOSEF WEBER, a subject of the King of Prussia, German Emperor, and a resident of Essen-on-the-Ruhr, in the Province of the Rhine, German Empire, have invented certain new and useful Improvements in Processes of Detinning, of which the following is an exact specification.

I have discovered that the problem of detinning commercially and on a large scale, by means of chlorin gas, has a different aspect from that which was presented in all prior processes of this kind with which I am familiar. Practically all of these processes have proceeded upon the assumption that, whatever the particular mode of procedure might be, it was essential to operate in such a manner that the temperature within the reaction chamber would be so controlled as to keep it below the point at which the chlorin would substantially attack and combine with the iron, and that if the iron were substantially attacked the ratio of the total expense to the value of the products recovered would be prohibitive. Within this term "total expense" I of course include the cost of any auxiliary processes of purification of an impure product, etc. I have found, however, that in commercial detinning, it is practicable to keep well within the commercial limit of this ratio, and at the same time effect substantial economies, by a wide departure from previous practice. The detinning of tin scrap by means of chlorin gas is an art that cannot be practised commercially except on a large scale. If the ratio of expense to the value of the recovered products is exceeded, commercial detinning obviously becomes impracticable. There are many factors that enter into the determination of the value of the terms of this ratio, and particularly of its first term, *i. e.* expense, which of course is usually the more variable and the more important. Among these are included the cost of chlorin, the time required for completing a run, the amount of chlorin that combines with the iron, etc., the expense of handling the materials and of purification of the products of the reaction when this is necessary, etc. Some of these factors are controlled by conditions outside the detinning process; but others are controlled wholly and mainly by the mode of practising the process. Among the latter are the length of time required for completing a run, the percentage of chlorin that combines with the iron, the expense of purification, etc. A material saving effected in one of these factors may very greatly reduce the value of the first term of said ratio, and correspondingly increase the margin of profit in practising the chlorin process of detinning.

In operating on a large scale, I have discovered that, contrary to all previous experience, I believe, it is not essential in the chlorin process to keep the temperature during detinning, down to a point so low that there will not be substantial attack upon the iron by the chlorin, and consequently substantially no conversion of chlorin, with iron, into ferric chlorid. I have discovered that it is practical to depart from the low-temperature chlorin process of detinning heretofore practised, to carry on commercial chlorin detinning operations at a temperature considerably above that at which the iron of the scrap is attacked while at the same time dissipating rapidly the heat generated by the reaction, and to permit a considerable percentage of the chlorin introduced into the reaction chamber to combine with the iron and form ferric chlorid—and that this may be done while keeping the ratio of the total expense to the value of the products recovered well within the aforesaid commercial limit. I have found that the losses due to the union of a considerable percentage of the chlorin with the iron of the scrap, etc., are offset by the gain due to the saving in time required for carrying out the chlorin detinning process, etc. In practice I have been able to keep within the prescribed ratio and operate with such speed as to cause approximately 20% of the chlorin to combine with the iron of the scrap. The temperature should not be allowed to rise too high, however, at any point in the reaction chamber, and in order that it may be equalized throughout the chamber, and kept within proper limits, I make use in practice of the method of equalizing and reducing the temperature set forth in the application Ser. No. 328,793, filed jointly by Karl Goldschmidt and myself on the 1st August, 1906.

In carrying out my present process, I preferably make use of a detinning tank having a capacity of say 60 tons, which tank is filled with the scrap, this scrap being usually in the form of compact bundles. Into this detinning vessel, the chlorin gas, preferably in a dry state, is then introduced and reacts upon the tin of the scrap, either alone or in the presence of inert gases, usually in the presence of the air that is contained in the tank. The introduction of chlorin is regulated in such a manner as to keep the temperature within the apparatus at the desired point. In order to prevent an undue rise in temperature at a localized point or points in the tank, a thorough commingling of the particles of gas, etc., is continuously effected in some suitable manner, as for example, by imparting a violent circulating or whirling motion to these particles, and as a result of this an immediate equalization of the temperature in the apparatus is obtained and may be readily maintained. The desired result may be accomplished by any suitable means, as, for example, by dividing the detinning apparatus into two or more chambers and causing the fluids to circulate in them, or by continuously passing and repassing said fluids through a single chamber; a pump or other suitable means being employed in either case.

As in the similar process described in the aforesaid application, maintaining the fluids in the reaction chamber or chambers in violent motion results in a rapid reduction of the temperature within the apparatus by the convection of the heat by the particles of fluid to the walls of the chamber or other points where the heat is readily dissipated, this action being usually assisted by circulating cold water continuously over the outside of the apparatus in a manner well understood. In the present case, however, while the temperature is effectively equalized at all points in the apparatus, it is not reduced to the same extent as in the process of the aforesaid application, but instead is permitted to remain at a considerably higher level, that is to say, at a point at which a considerable percentage of chlorin present will attack and combine with the iron of the scrap and thus form ferric chlorin, as well as stannic chlorid; these two products being subsequently separated and recovered, or purified in any suitable manner, it being understood, of course, that even when the additional time and expense of the subsequent separation and purification of the products of the reaction are added to the time required for completing a run under this high temperature process, the saving due to the time gained in the main reaction more than offsets the time lost in completing a run under the theoretically more advantageous process of detinning at such a low temperature that the iron of the scrap is not attacked and no subsequent separation and purification of the products of the reaction is required.

What I claim is:

1. A process of treating material containing tin and iron in a closed vessel, which consists in subjecting said material to the action of chlorin gas at a temperature above that at which the iron is attacked, and continuously effecting a thorough commingling of the particles of gas in the vessel.

2. A process of treating material containing tin and iron in a closed vessel, which consists in subjecting said material to the action of chlorin gas at a temperature above that at which the iron is attacked, and simultaneously dissipating a large portion of the heat generated in the vessel by the reaction.

3. A process of treating material containing tin and iron in a closed vessel, which consists in subjecting said material to the action of chlorin gas at a temperature above that at which the iron is attacked, and continuously circulating said gas in contact with a heat-absorbing medium to dissipate a large portion of the heat generated in the vessel by the reaction.

4. The process of detinning bundles of compressed tin scrap in a closed vessel, which consists in subjecting said bundles to the action of chlorin gas at a temperature above that at which the iron of the scrap is attacked, and simultaneously dissipating a large portion of the heat generated in the vessel by the reaction.

5. A process of treating material containing tin and iron in a closed vessel, which consists in subjecting said material to the action of chlorin gas at a temperature above that at which the iron is attacked, and simultaneously equalizing the temperature substantially throughout the reaction vessel and dissipating a large percentage of the heat generated in the vessel by the reaction.

6. A process of treating material containing tin and iron in a closed vessel, which consists in subjecting said material to the action of chlorin gas at a temperature above that at which the iron is attacked, and simultaneously effecting a thorough commingling of the particles of gas in the vessel and dissipating a large percentage of the heat generated in the vessel by the reaction.

7. A process of treating material containing tin and iron in a closed vessel, which consists in subjecting said material to the action of chlorin gas at a temperature above that at which the iron is attacked, and continuously effecting a thorough commingling of the particles of gas in the vessel, and purifying the resulting products of the reaction.

8. A process of treating material containing tin and iron in a closed vessel, which consists in subjecting said material to the action of chlorin gas at a temperature above that at which the iron is attacked and simultaneously dissipating a large portion of the heat generated in the vessel by the reaction, and purifying the resulting products of the reaction.

9. The process of detinning bundles of compressed tin scrap in a closed vessel, which consists in subjecting said bundles in the presence of an inert gas to the action of chlorin gas at a temperature above that at which the iron of the scrap is attacked, continuously effecting a thorough commingling of the particles of chlorin gas and inert gas in the vessel, and purifying the resulting products of the reaction.

10. The process of treating material containing tin and iron, which consists in subjecting such material to the action of chlorin containing gas, and equalizing and maintaining by rapid movement of the gas, the temperature due to the reaction, at such a point that the tin will be converted into stannic chlorid and some of the iron into ferric chlorid.

11. The process of treating material containing tin and iron to produce liquid stannic chlorid and ferric chlorid, which consists in subjecting the material to the action of chlorin containing gas at a temperature above that at which the iron is attacked and simultaneously dissipating a large portion of the reaction heat by rapid movement of the gas.

In witness whereof I have hereunto set my hand in the presence of two witnesses.

JOSEF WEBER. [L. S.]

Witnesses:
 HELEN NUFER,
 ALBERT NUFER.